US012755310B2

(12) United States Patent
Yap et al.

(10) Patent No.: US 12,755,310 B2
(45) Date of Patent: Oct. 6, 2026

(54) LEVERAGING LARGE LANGUAGE MODELS IN CONTENT-BASED RECOMMENDATION SYSTEMS

(71) Applicant: SAP SE, Walldorf (DE)

(72) Inventors: Benjamin Yan Han Yap, Singapore (SG); Karen Yen Thong Tan, Singapore (SG); En Zhi Tan, Singapore (SG); Jia Xiang Lim, Singapore (SG); Benjamin Jin Boon Tan, Singapore (SG); Lenald Ng, Singapore (SG); Jie Xiang Yap, Singapore (SG); Rana Saha, Singapore (SG); Sai Mun Lee, Singapore (SG); Viet Hoang Nguyen, Singapore (SG); Pern Piao Calvin Soh, Walldorf (DE); Steven Peng Chen Fu, Singapore (SG)

(73) Assignee: SAP SE, Walldorf (DE)

( * ) Notice: Subject to any disclaimer, the term of this patent is extended or adjusted under 35 U.S.C. 154(b) by 23 days.

(21) Appl. No.: 18/915,455

(22) Filed: Oct. 15, 2024

(65) Prior Publication Data

US 2026/0105507 A1 Apr. 16, 2026

(51) Int. Cl.
*G06Q 30/0601* (2023.01)
*G06T 17/00* (2006.01)

(52) U.S. Cl.
CPC ..... *G06Q 30/0631* (2013.01); *G06Q 30/0603* (2013.01); *G06Q 30/0643* (2013.01); *G06T 17/00* (2013.01)

(58) Field of Classification Search
CPC .......... G06Q 30/0631; G06Q 30/0603; G06Q 30/06031; G06Q 30/06032
See application file for complete search history.

(56) References Cited

U.S. PATENT DOCUMENTS

2010/0082592 A1* 4/2010 Ruvini .................. G06F 16/288 707/706
2010/0268661 A1* 10/2010 Levy ...................... G06Q 30/02 705/347

(Continued)

OTHER PUBLICATIONS

Wang et al., "Rethinking E-Commerce Search"; ACM SIGIR Forum, vol. 57, No. 2; Dec. 2023 (Year: 2023).*

(Continued)

*Primary Examiner* — Kevin H Flynn
(74) *Attorney, Agent, or Firm* — Fish & Richardson P.C.

(57) ABSTRACT

Methods, systems, and computer-readable storage media for receiving interaction data representative of an item a user has interacted with, the item being included in a set of items available to users, generating a set of recommended items through content-based collaborative filtering using the first item, determining that the first set of recommended items includes a virtual item that had been generated by the LLM, and in response, determining another item from a map using the virtual item as an index, the map mapping items to virtual items generated by the LLM, and replacing the virtual item with the other item in the set of recommended items to provide a modified set of recommended items, and transmitting item data representative of the modified set of recommended items to display items in the modified set of recommended items to the user.

15 Claims, 6 Drawing Sheets

(56) References Cited

U.S. PATENT DOCUMENTS

| | | | | |
|---|---|---|---|---|
| 2012/0016642 | A1* | 1/2012 | Li | G06Q 30/02 703/2 |
| 2015/0112801 | A1* | 4/2015 | Nice | G06Q 30/0255 705/14.53 |
| 2022/0222728 | A1* | 7/2022 | Gupta | G06Q 30/0201 |
| 2023/0169565 | A1* | 6/2023 | Ma | G06Q 30/0631 705/26.7 |
| 2025/0124484 | A1* | 4/2025 | Mesard | G06F 40/40 |
| 2025/0245723 | A1* | 7/2025 | Nag | G06Q 30/0201 |

OTHER PUBLICATIONS

Wei et al., Confidence-Aware Sub-Structure Beam Search (CABS): Mitigating Hallucination in Structured Data Generation with Large Language Models; May 30, 2024 (Year: 2024).*

* cited by examiner

LEVERAGING LARGE LANGUAGE MODELS IN CONTENT-BASED RECOMMENDATION SYSTEMS

BACKGROUND

Enterprises provide different items (e.g., goods, services) to users and seek to provide the most relevant items that may be beneficial or of interest to users. To this end, recommendation systems have been developed, which recommend items to users. For example, a recommendation system can be provided as part of an electronic commerce (e-commerce) platform that users can engage with to find and purchase items. Recommendation systems can use machine learning (ML) models, such as self-learning algorithms.

However, recommendation systems can suffer from various technical challenges including the so-called cold-start problem. The cold-start problem occurs when a ML model of a recommendation system does not have sufficient training data. As a consequence, the recommendation system can make inaccurate predictions. Further, it can take a long time before sufficient training data is developed for comprehensive training of the ML model of the recommendation system.

SUMMARY

Implementations of the present disclosure are directed to content-based recommendation systems. More particularly, implementations of the present disclosure are directed to leveraging large language models (LLMs) to improve performance of content-based recommendation systems.

In some implementations, actions include receiving first interaction data representative of a first item a user has interacted with, the first item being included in a set of items available to users, generating a first set of recommended items through content-based collaborative filtering using the first item, determining that the first set of recommended items includes a virtual item that had been generated by the LLM, and in response, determining an item from a map using the virtual item as an index, the map mapping items to virtual items generated by the LLM, and replacing the virtual item with the item in the first set of recommended items to provide a modified set of recommended items, and transmitting first item data representative of the modified set of recommended items to display items in the modified set of recommended items to the user. Other implementations of this aspect include corresponding systems, apparatus, and computer programs, configured to perform the actions of the methods, encoded on computer storage devices.

These and other implementations can each optionally include one or more of the following features: actions further include, during a pre-production stage, generating a set of prompts using a sub-set of items of the set of items, prompting the LLM using the set of prompts, the LLM returning a set of virtual items, each virtual item being responsive to a prompt in the set of prompts, the virtual item being included in the set of virtual items, and creating the map using the sub-set of items and the set of virtual items; actions further include, during the pre-production stage, generating a set of vectors from a catalog of items, each vector in the set of vectors representative of an item in the catalog of items, defining a set of clusters, each cluster including a respective sub-set of vectors of the set of vectors, and determining the sub-set of items from the set of clusters; the map is generated in a pre-production stage and includes a set of item and virtual item pairs; content-based collaborative filtering is executed using an extended set of vectors including a first set of vectors representative of items in an item catalog and a second set of vectors representative of virtual items provided by the LLM; vectors in the extended set of vectors are generated by a semantic textual similarity machine learning (ML) model; and actions further include receiving second interaction data representative of a second item a user has interacted with, generating a second set of recommended items through content-based collaborative filtering using the second item, and determining that the second set of recommended items is absent any virtual items, and in response, transmitting second item data representative of the second set of recommended items to display items in the second set of recommended items to the user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
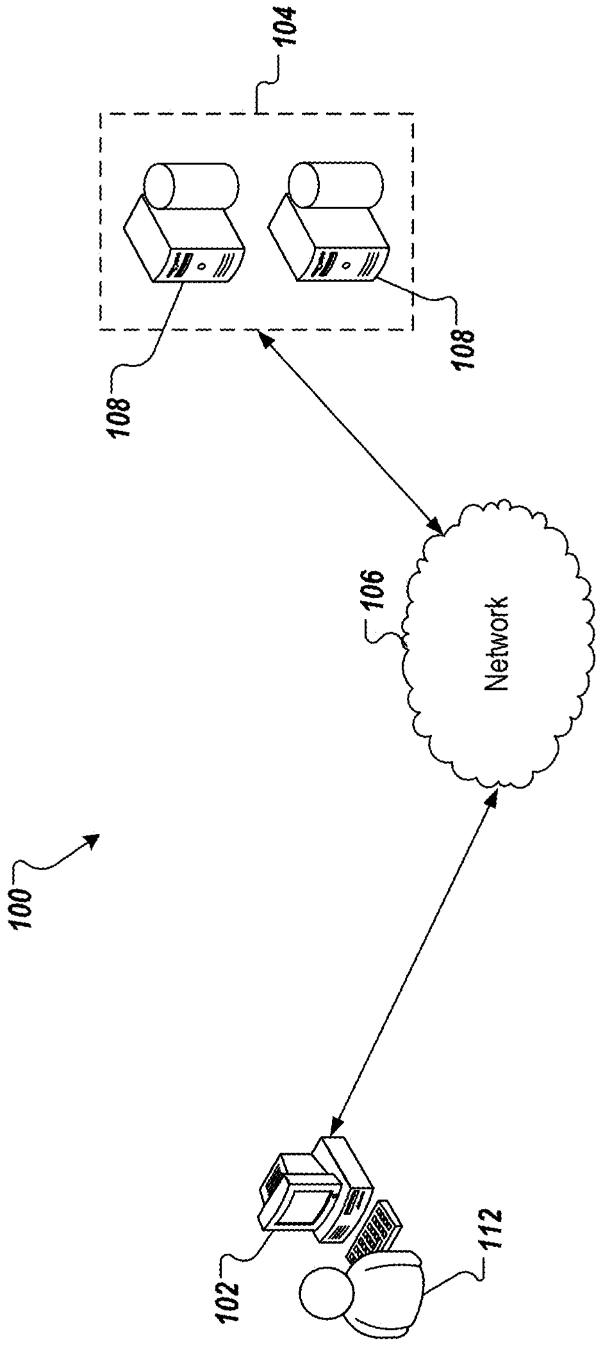
FIG. 1 depicts an example architecture that can be used to execute implementations of the present disclosure.

Implementations of the present disclosure are directed to content-based recommendation systems. More particularly, implementations of the present disclosure are directed to leveraging large language models (LLMs) to improve performance of content-based recommendation systems. Implementations can include actions of receiving interaction data representative of an item a user has interacted with, the item being included in a set of items available to users, generating a set of recommended items through content-based collaborative filtering using the first item, determining that the first set of recommended items includes a virtual item that had been generated by the LLM, and in response, determining another item from a map using the virtual item as an index, the map mapping items to virtual items generated by the LLM, and replacing the virtual item with the other item in the set of recommended items to provide a modified set of recommended items, and transmitting item data representative of the modified set of recommended items to display items in the modified set of recommended items to the user.

To provide context for implementations of the present disclosure, and as introduced above, recommendation systems have been developed and deployed, which recommend items (e.g., goods, services) to users. For example, a recommendation system can be provided as part of an electronic commerce (e-commerce) platform that users can engage to find and purchase items. Recommendation systems provide value to by personalizing content served to users, which results in increased conversion rates and user satisfaction (e.g., as compared to platforms that do not use a recommendation system). That is, recommendation systems predict what items each user may be interested in and surfaces those items during user interactions.

Recommendation systems can include machine learning (ML) models, such as a self-learning algorithm, and can be built in various ways, depending on the in-domain resources that the recommendation system has access to. An example in-domain resource can include an interaction history log that represents historical interactions between users and platforms. For example, an interaction history log can record user searches, search results presented to users, user conversions (e.g., items selected by users from search results), and the like. In cases where such an interaction history log is absent or is not comprehensive (e.g., logs a relatively short history of user interactions, does not account for new items added, does not account for old items removed), the recommendation system faces a cold-start problem.

In general, the cold-start problem occurs when there is not sufficient interaction data for training the ML model. For instance, when new items are added into an e-commerce platform, the recommendation system may not have sufficient, or even any, information or user interaction data on such new items. As such, the recommendation system may make poor recommendations for new items due to the lack of training data. Further, it can take a long time for the recommendation system to gather sufficient user interactions representative of new items for training to improve prediction accuracy. To address such problems, traditional approaches can rely on content similarity methods, such as content-based collaborative filtering, and/or querying a LLM provided by a third-party.

In general, content-based collaborative filtering can be described as using item metadata from items that have user interaction data to recommend related or similar items. In content-based recommendation systems, each item is converted into a vector. In some instances, term frequency-inverse document frequency (TF-IDF) is used to convert categorical or (tokenized) text features into a feature vector. In some examples, a pre-trained ML model, such as Bidirectional Encoder Representations from Transformers (BERT), an opens source ML model for natural language processing (NLP), is used to convert text features of items into dense vectors. Using content-based collaborative filtering, given one or more interactions from a user, the most similar items in vector space are retrieved. Selection of these items can include choosing items with the highest vector cosine similarity or dot product to the vector of the interacted item(s), or smallest Euclidean distance therebetween.

In recent years, LLMs, such as GPT-4, have shown state-of-the-art performance on various NLP tasks. This is despite the LLMs not being specifically trained or tuned for each task and without the need for any task-specific training dataset. As a result, application of LLMs to various use cases, such as in recommendation systems, have been investigated to determine how a LLM can be used to directly generate personalized recommendations. One way to directly obtain recommendations from an LLM is to first fine-tune the LLM to a specific domain using datasets representative of that domain. In this manner, the fine-tuned LLM can be used to generate recommendations for unseen datasets. If prior training data is unavailable, a so-called vanilla LLM can be used to generate unconstrained recommendations, which are then used to search for similar items within the set of available items.

To address the issue of LLM recommendations not being part of the set of items that is available (e.g., through a particular e-commerce platform the recommendation system is deployed for), the set of items can be included in the prompt that is input to the LLM, which gives the LLM the task of ranking the items in the set of items. In some examples, the top-k items in the ranking returned by the LLM are selected for presentation to the user. However, due to limitations on prompt size (e.g., maximum number of tokens that can be used in a prompt), a subset of the set of items can be selected for inclusion in the prompt.

Another approach for re-ranking involves prompting the LLM multiple times to avoid prompt length limitations. For example, a pair-wise approach can be used to iteratively compare two items in the set of items until the top-k items emerge. As every prompt only contains metadata from two items, it is unlikely that prompt length is a limitation. This point-wise approach prompts the LLM to generate a score for each item from the set of items and the scores are used to sort the items with the top-k items being selected for presentation to the user.

However, these approaches suffer from technical challenges and limitations. For example, content-based recommendations often suffer from the lack of diversity and relevance, due to the nature of how similar items are selected in view of other items. For example, a user who has just purchased a laptop would not want to be recommended more laptops. Instead, complementary items, such as keyboards or monitors, would be more suitable. For LLM-based recommendations, direct recommendation approaches do not guarantee that recommended items are in the set of items that are actually available. For example, and as noted above, LLMs are not trained on specific domains, so would not be trained on the set of items that are available through, for example, the particular e-commerce platform.

Further, re-ranking methods include the set of items in the prompt, but are limited by prompt length. As a result, such approaches are not able to support a large number of available items for recommendation, a common scenario of recommendation use-cases. In the case where heuristics (e.g., most popular items) are used to select a subset of the set of items to use in the prompt, this suffers from a long-tail effect where rarer items will never be recommended. In addition, given N number of available items, re-ranking approaches, such as point-wise (N LLM accesses), pair-wise (approximately $N^2$ LLM accesses) and list-wise $$\text{(approximately } \frac{N}{L/2},$$

where L represents a window-length in a sliding window), scale either linearly or quadratically with respect to the number of available items per recommendation. This results in increased consumption of technical resources (processing, memory, bandwidth) and reduced performance in terms of latency (time consumed to return recommendations to users). These limitations and resource inefficiencies render such approaches impractical for most use cases.

In view of the above context, implementations of the present disclosure provide a recommendation system that augments content-based recommendation techniques using one or more LLMs. More particularly, implementations of the present disclosure leverage the innate world knowledge of LLMs to overcome issues of prior approaches, such as lack of diversity and relevance. Further, implementations of the present disclosure are resource-efficient by using a reduced number of LLM queries (prompts) relative to prior approaches, such as those discussed herein. This resource-efficiency is achieved while providing fresh, unexpected, and relevant item recommendations.

As described in further detail herein, implementations of the present disclosure use an off-the-shelf, pre-trained ML model to convert features of each item (e.g., title, description) to an item vector. In some examples, a clustering algorithm is used to group similar item vectors together in clusters. From each cluster, A samples are taken and are used to query (prompt) an LLM to generate virtual items that complement each sample. In some examples, a mapping is stored that maps a sample item to a corresponding virtual item. An item vector is generated for each virtual item using the LLM and are included in the vector space of all items, even though they will not be recommended. Instead, and in accordance with implementations of the present disclosure, if a virtual item is retrieved using content-based collaborative filtering (e.g., cosine similarity scores), the original, non-virtual item is returned using the stored mapping.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a recommendation system for recommending items to users, such as the user 112. For example, the recommendation system can be provided as part of an e-commerce platform that is hosted by the server system 104 and enables users to search for and purchase items of a set of items that are available through the e-commerce platform. As described in further detail herein, the recommendation system of the present disclosure leverages a LLM to generate virtual items that can be used to make recommendations to users of items in the set of items that are available.

Figure 2:
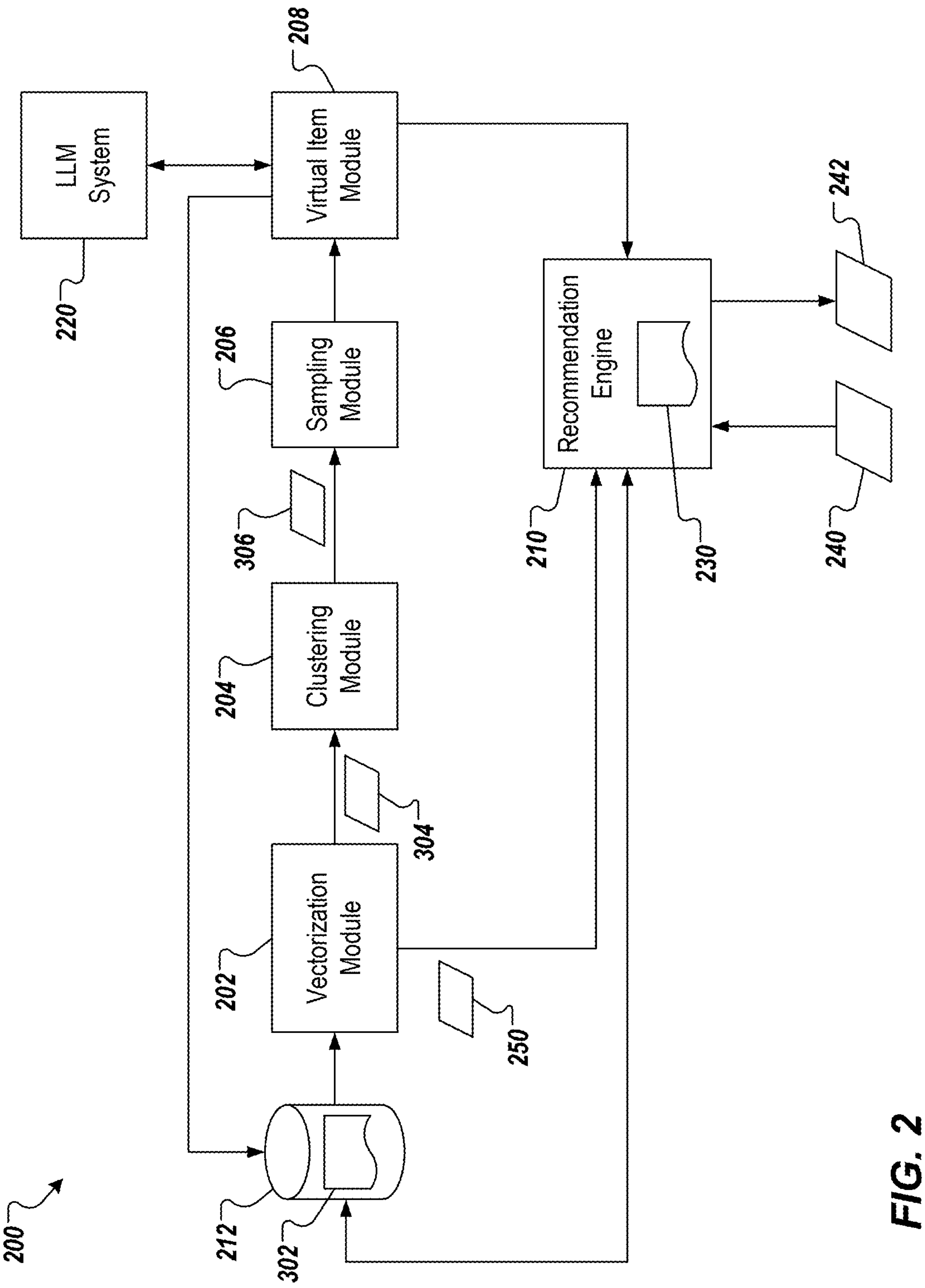
FIG. 2 depicts a conceptual architecture that can be used to execute implementations of the present disclosure.

FIG. 2 depicts an example conceptual architecture 200 in accordance with implementations of the present disclosure. In the depicted example, the conceptual architecture 200 includes a vectorization module 202, a clustering module 204, a sampling module 206, a virtual item module 208, a recommendation engine 210, and a datastore 212. In some examples, the vectorization module 202, the clustering module 204, the sampling module 206, the virtual item module 208, the recommendation engine 210, and the datastore 212 make up at least a portion of a recommendation system. In the example of FIG. 2, the conceptual architecture 200 includes a LLM system 220. In some examples, the LLM system 220 executes a LLM (e.g., GPT-4) and is provided by a third-party service provider.

As described in further detail herein, the recommendation system of the present disclosure leverages the LLM system 220 to generate virtual items based on items included in an item catalog that is stored in the datastore 212. In some examples, a virtual item is an item that is not available (e.g., cannot be purchased through the e-commerce system). For example, a virtual item can be fictional. A map 230 is provided that maps each virtual item to an item (i.e., an item that is actually available). The recommendation engine 210 receives and processes interaction data 240 of a user to determine and return item data 242 that is descriptive of one or more items that are available and are recommended to the user.

Figure 3:
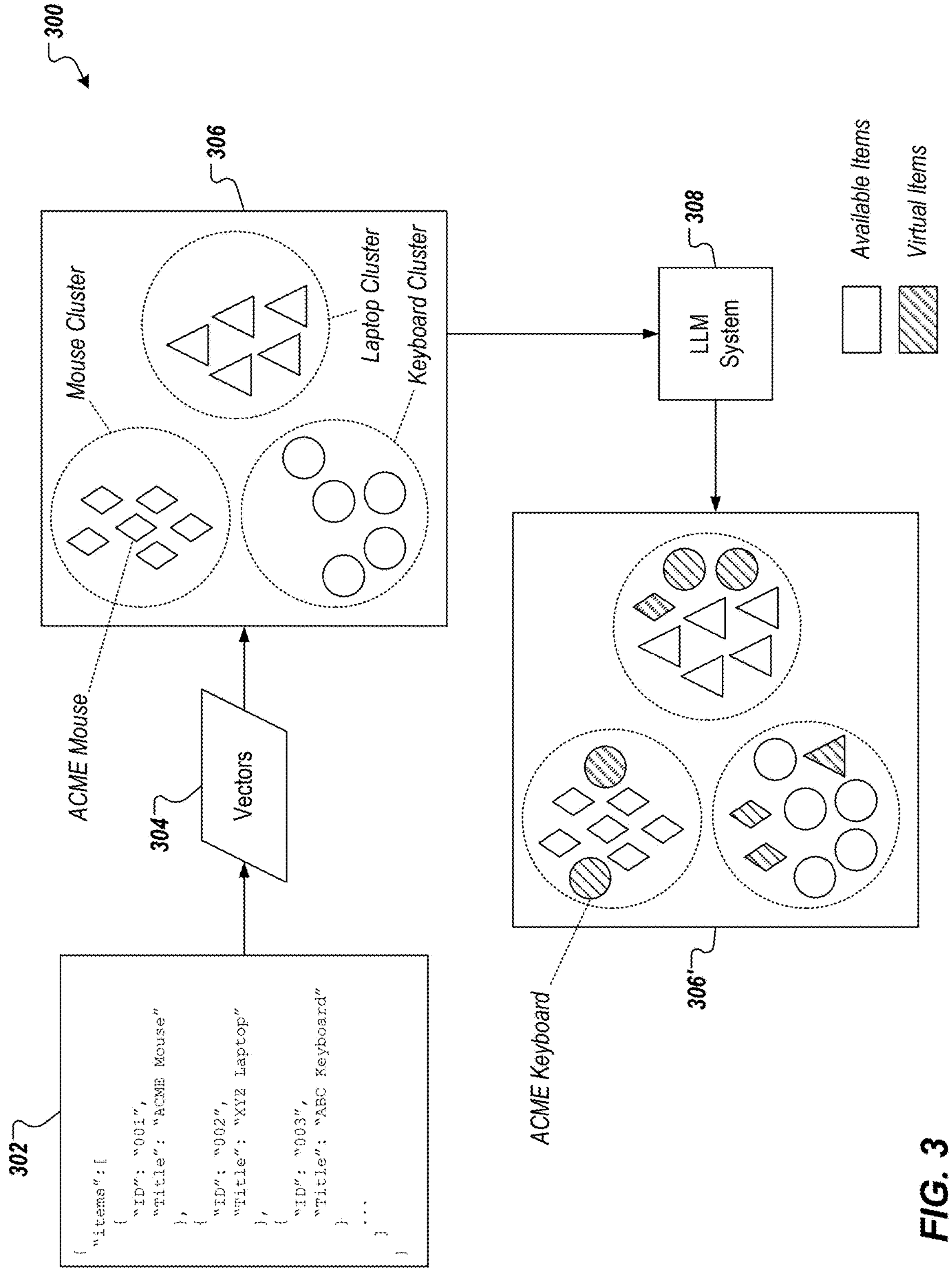
FIG. 3 depicts a conceptual flow in accordance with implementations of the present disclosure.

FIG. 3 depicts a conceptual flow 300 in accordance with implementations of the present disclosure. The conceptual flow 300 includes an item catalog 302, a set of vectors 304, a set of clusters 306, a LLM system 308 (e.g., the LLM system 220 of FIG. 2), and a revised set of cluster 306'. Implementations of the present disclosure are described in further detail herein with combined reference to FIGS. 2 and 3.

Referring again to FIG. 2, the datastore 212 stores an item catalog, such as the item catalog 302. In some examples, the item catalog includes a set of items that are available. That is, items in the set of items include actual items that can be recommended to users and that users could purchase. As such, the set of items can also be referred to as a set of available items. In some examples, for each item, the item catalog includes metadata that is descriptive of the item. In some examples, the metadata includes an item identifier (ID), a title, a description, and the like.

In some implementations, the vectorization module 202 processes the item catalog to generate a set of vectors, such as the vectors 304. In some examples, for each item, the vectorization module 202 extracts item metadata (e.g., title, description) from the item catalog and generates a textual string that uniquely describes the item. For example, the vectorization module 202 can concatenate the title and description (e.g., title|description) to generate the textual string. In some examples, the vectorization module 202 processes the textual string through a pre-trained semantic textual similarity model (ML model) that converts the textual string into a multi-dimensional vector (which can also be referred to as an embedding). In general, semantic textual similarity ML models are trained to generate vectors whereby text with the same or similar semantics will be converted to similar vectors in a vector space. An example semantic textual similarity ML model includes MPNet. In some examples, the vectorization module 202 generates a set of vectors represented as $V=\{v_1, v_2, \ldots, v_N\}$, where N represents the number of (unique) items in the item catalog.

In some implementations, the clustering module 204 receives the set of vectors 304 from the vectorization module 202 and processes the set of vectors 304 to generate a set of clusters, such as the set of clusters 306. In some examples, the clustering module 204 processes the vectors through a clustering algorithm, such as K-Means, to define a set of clusters represented as $C=\{c_1, c_2, \ldots, c_M\}$, where M represents the number of clusters in the set of clusters. In generating the clusters, a constraint can be provided as $M<<N$ (i.e., M is much less than N). Each cluster represents items that are determined to be similar by at least a threshold degree of similarity. For example, clustering can include minimizing within-cluster variances (e.g., squared Euclidean distances) between pairs of vectors.

In some implementations, the sampling module 206 receives the set of clusters 306 from the clustering module 204 and, for each cluster, determines a set of sample items. In some examples, each set of sample items includes A items. In some examples, sampling can include, for each cluster, identifying A items as anchor items and including the A items in the set of sample items for the respective cluster. In some examples, items are randomly selected from each cluster as anchor items.

In some implementations, the virtual item module 208 receives the sets of sample items from the sampling module 206. In some examples, the virtual item module 208 also receives the set of clusters. In some examples, for each set of sample items, the virtual item module 208 prompts the LLM system using the respective set of anchor items. In some examples, for each anchor item in a set of anchor items, the virtual item module 208 generates a prompt using a prompt template. An example prompt template can be provided as:

> YOU ARE AN EXPERT RECOMMENDATION SYSTEM. GIVEN THE FOLLOWING ITEM {{ITEM_TEXT}}, GENERATE DISSIMILAR YET RELEVANT ITEMS THAT A USER SHOULD INTERACT WITH BEFORE INTERACTING WITH THIS ITEM.

where {{ITEM_TEXT}} is a placeholder that is populated with the title and/or description (e.g., provided from the item catalog) of a respective anchor item. In some examples, for each prompt, the LLM system 220 returns a virtual item that is responsive to the prompt. In some examples, each virtual item includes text (e.g., title and/or description) that is generated by the LLM system 220 and is descriptive of the virtual item.

For purposes of non-limiting illustration, example items and virtual items can be discussed with reference to FIG. 3. In the example of FIG. 3, a cluster in the set of clusters 306 can include an item "ACME Mouse," which is determined to be an anchor item for the cluster. The LLM system 308 is prompted with a prompt that is generated using the prompt template and metadata of the anchor item. In response to the prompt, the LLM system can return a virtual item of "ACME Keyboard."

Referring again to FIG. 2, and as described herein, the virtual item module 208 prompts the LLM system 220 to generate VI virtual items (e.g., $VI=\{vi_1, \ldots, vi_{A \times VI}\}$). In some implementations, the map 230 is generated and maps each anchor item to its respective virtual item. In some examples, the map 230 can include a table having a column of anchor items and a column of virtual items, where each row defines an anchor item and virtual item pair. In some examples, the virtual item module 208 provides the map 230 to the recommendation engine 210. In some examples, the virtual item module 208 returns the set of virtual items to the datastore 212.

In some implementations, the vectorization module 202 generates an extended set of vectors 250 that includes the set of vectors for the items (e.g., the set of vectors 304) as well as a set of vectors for the virtual items. For example, the extended set of vectors 250 can be represented as $V_{EXT}=\{v_1, v_2, \ldots, v_{N+(A \times VI)}\}$, where the set of vectors for the virtual items can be presented as $V_{VIRT}=\{v_{N+1}, \ldots, v_{N+(A \times VI)}\}$.

Accordingly, and as described above, the LLM system 220 is leveraged to generate virtual items that are used to create the extended set of vectors 250. This can occur in a pre-production stage, prior to the recommendation engine 210 generating recommendations to users. In a production stage, the recommendation engine 210 uses the extended set of vectors 250 and the map 230 to determine items that are to be recommended to users, as described in further detail herein. Here, it can be noted that, during the production stage, the LLM is not prompted. That is, the LLM is leverage during the pre-production stage, but is not used during the production stage.

As discussed above, the recommendation engine 210 receives and processes interaction data 240 of a user to determine and return item data 242 that is descriptive of one or more items that are available and are recommended to the user. For example, the recommendation engine 210 can use content-based collaborative filtering. In some examples, content-based collaborative filtering can be described as returning top-k items as recommendations based on the one or more items represented in the interaction data. In some examples, each item represented in the interaction data 240 is converted into a vector. In some examples, each item is converted into a vector by vector-lookup, which can include looking up a vector for an item from a pre-defined table of item-vectors (e.g., pre-generated vectors). In some examples, the vectors are aggregated (e.g., by mean-pooling) into a query vector q, where the query vector q is of the same dimension as the item vectors.

In some implementations, a set of scores is determined by comparing the query vector to each vector in the extended set of vectors 250. In some examples, each score is determined as a dot product of q and each item vector in $V_{EXT}$. In this manner, a set of scores is provided as $S=\{s_1, s_2, \ldots, s_{N+(A \times VI)}\}$. In some examples, the scores are sorted in rank order (e.g., highest to lowest) and the top-k scores are determined (e.g., the 4 highest scores). The items and/or virtual items corresponding to the top-k scores are identified as the top-k item recommendations. If the top-k item recommendations do not include any virtual items, the top-k item recommendations are returned (e.g., in the item data 242).

However, if the top-k item recommendations do include one or more virtual items, an item (available item) is identified for each virtual item and replaces the virtual item in the top-k item recommendations. For example, for each virtual item, the virtual item is used as to index the map 230 to determine the item (anchor item) that corresponds to the virtual item. After replacing any virtual items with (available) items, the top-k item recommendations are returned (e.g., in the item data 242). With non-limiting reference to the example of FIG. 3, if the top-k item recommendations includes the virtual item "ACME Keyboard," the virtual item is replaced with the item "ACME Mouse" in the top-k item recommendations.

Figure 4A:
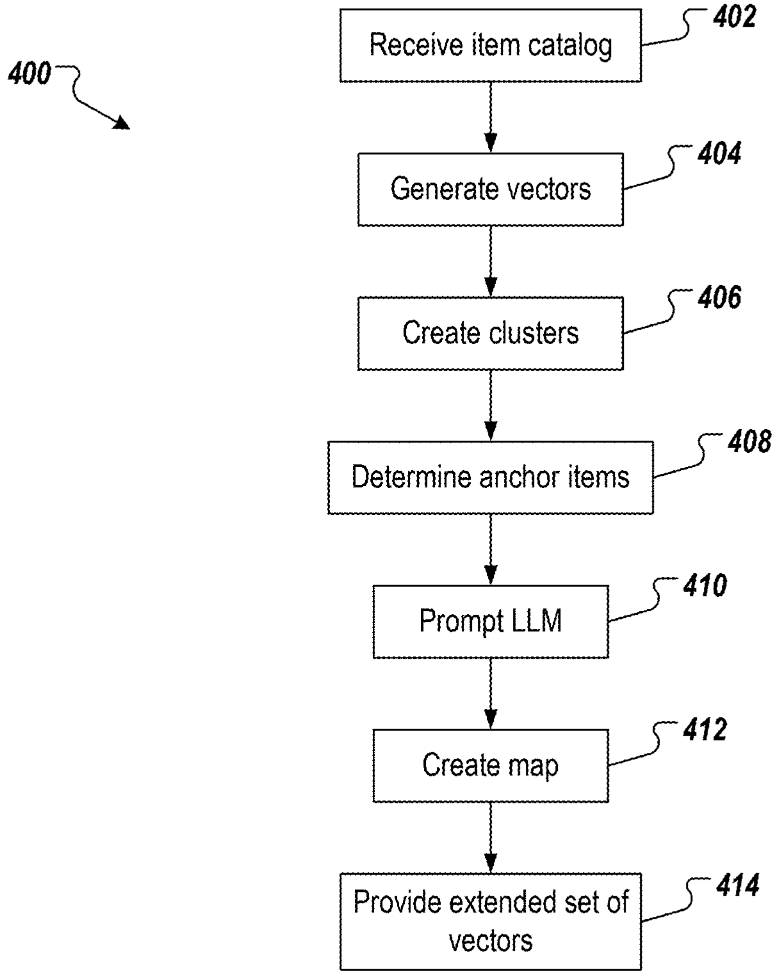
FIGS. 4A and 4B depict example processes that can be executed in accordance with implementations of the present disclosure.

FIG. 4A depicts an example process 400 that can be executed in accordance with implementations of the present disclosure. In some examples, the example process 400 is provided using one or more computer-executable programs executed by one or more computing devices. The example process 400 can be executed in a pre-production stage, as discussed above.

An item catalog is received (402) and a set of vectors is generated (404). For example, and as described in detail herein, the vectorization module 202 receives the item catalog 302 from the datastore 212 and processes the item catalog 302 to generate a set of vectors, such as the vectors 304. For example, for each item, the vectorization module 202 extracts item metadata (e.g., title, description) from the item catalog and generates a textual string that uniquely describes the item and processes the textual string through a pre-trained semantic textual similarity model (ML model) that converts the textual string into a multi-dimensional vector (which can also be referred to as an embedding).

A set of clusters is created (406) and a set of anchor items within each cluster is determined (408). For example, and as described in detail herein, the clustering module 204 receives the set of vectors 304 from the vectorization module 202 and processes the set of vectors 304 to generate the set of clusters 306 using a clustering algorithm, such as K-Means. The sampling module 206 receives the set of clusters 306 from the clustering module 204 and, for each cluster, determines a set of sample items. In some examples, sampling can include, for each cluster, identifying A items as anchor items and including the A items in the set of sample items for the respective cluster.

A LLM is prompted to return sets of virtual items (410). For example, and as described in detail herein, the virtual item module 208 receives the sets of sample items from the sampling module 206 and prompts the LLM system using the respective set of anchor items. In some examples, for each anchor item in a set of anchor items, the virtual item module 208 generates a prompt using a prompt template. For each prompt, the LLM system 220 returns a virtual item that is responsive to the prompt.

A map is created (412) and an extended set of vectors is provided (414). For example, and as described in detail herein, the virtual item module 208 creates the map 230 to map each anchor item to its respective virtual item, and the vectorization module 202 generates the extended set of vectors 250 that includes the set of vectors for the items (e.g., the set of vectors 304) as well as a set of vectors for the virtual items.

Figure 4B:
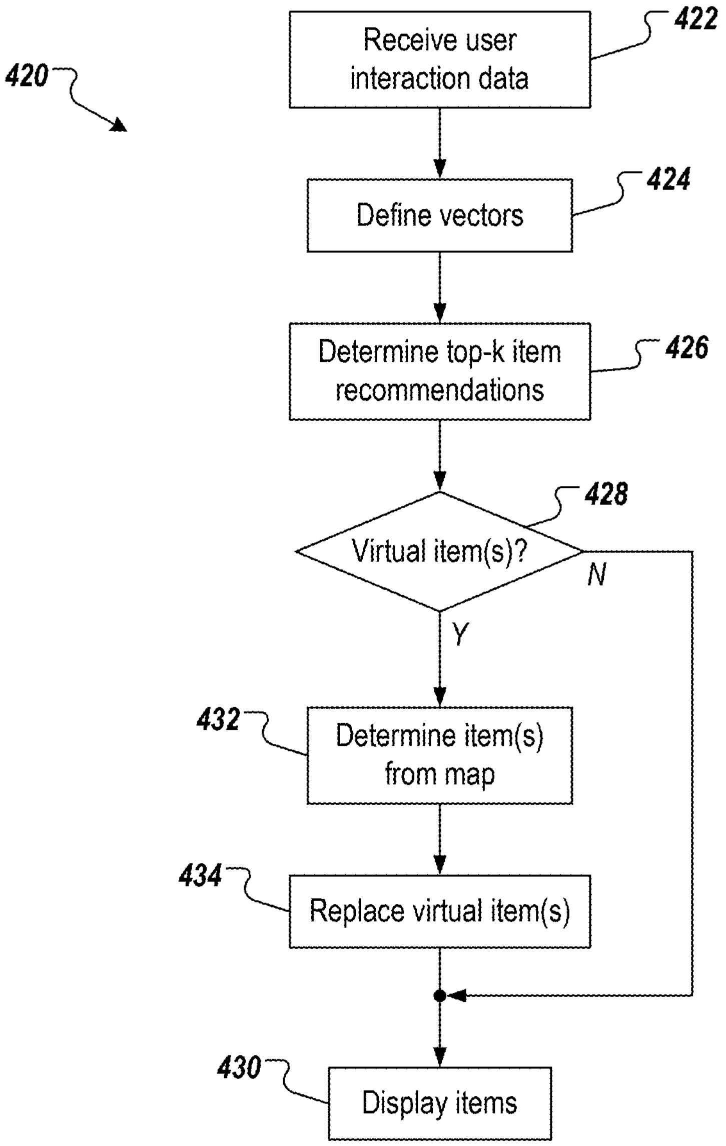

FIG. 4B depicts an example process 420 that can be executed in accordance with implementations of the present disclosure. In some examples, the example process 420 is provided using one or more computer-executable programs executed by one or more computing devices. The example process 420 can be executed in a production stage, as discussed above.

User interaction data is received (422) and a set of vectors is defined (424). For example, and as described in detail herein, the recommendation engine 210 receives and processes interaction data 240 and determines a vector for each item by vector-lookup, which can include looking up a vector for an item from a pre-defined table of item-vectors (e.g., pre-generated vectors). For example, the pre-defined table can include each item in the item catalog 302 being paired with its corresponding item vector in the set of vectors 304. A set of top-k item recommendations is determined (426). For example, and as described in detail herein, the recommendation engine 210 can use content-based collaborative filtering to return top-k items as recommendations based on the one or more items represented in the interaction data 240.

It is determined whether the top-k item recommendations include any virtual items (428). If there are no virtual items, the items in the top-k item recommendations are displayed (430). For example, the recommendation engine 210 provides the item data 242, which is representative of recommended items and can be processed to display recommended items to the user. If there are one or more virtual items, for each virtual item, a corresponding item is determined from the map (432) and replace the virtual item in the top-k recommended items (434). For example, and as described in detail herein, for each virtual item, the virtual item is used to index the map 230 to determine the item (anchor item) that corresponds to the virtual item, and the item replaces the virtual item in the top-k item recommendations. The items in the top-k item recommendations are displayed (430).

Implementations of the present disclosure provide technical advantages over traditional approaches in recommendation systems. For example, implementations of the present disclosure enable diverse and relevant item recommendations to be made, overcoming limitations of content-based collaborative filtering. For example, in prior approaches, a user who has just purchased a laptop would likely be recommended other laptops, because laptops would be recognized as being similar through content-based collaborative filtering. Instead, and with reference to the non-limiting examples herein, implementations of the present disclosure enable "ACME Mouse" to be recommended in response to user purchase of a keyboard. As another example, implementations of the present disclosure overcome issues in LLM-based recommendations by obviating multiple, iterative prompting of a LLM, which consumes significant technical resources, and avoids instances of the LLM generating fictional, unavailable items during the production stage.

Figure 5:
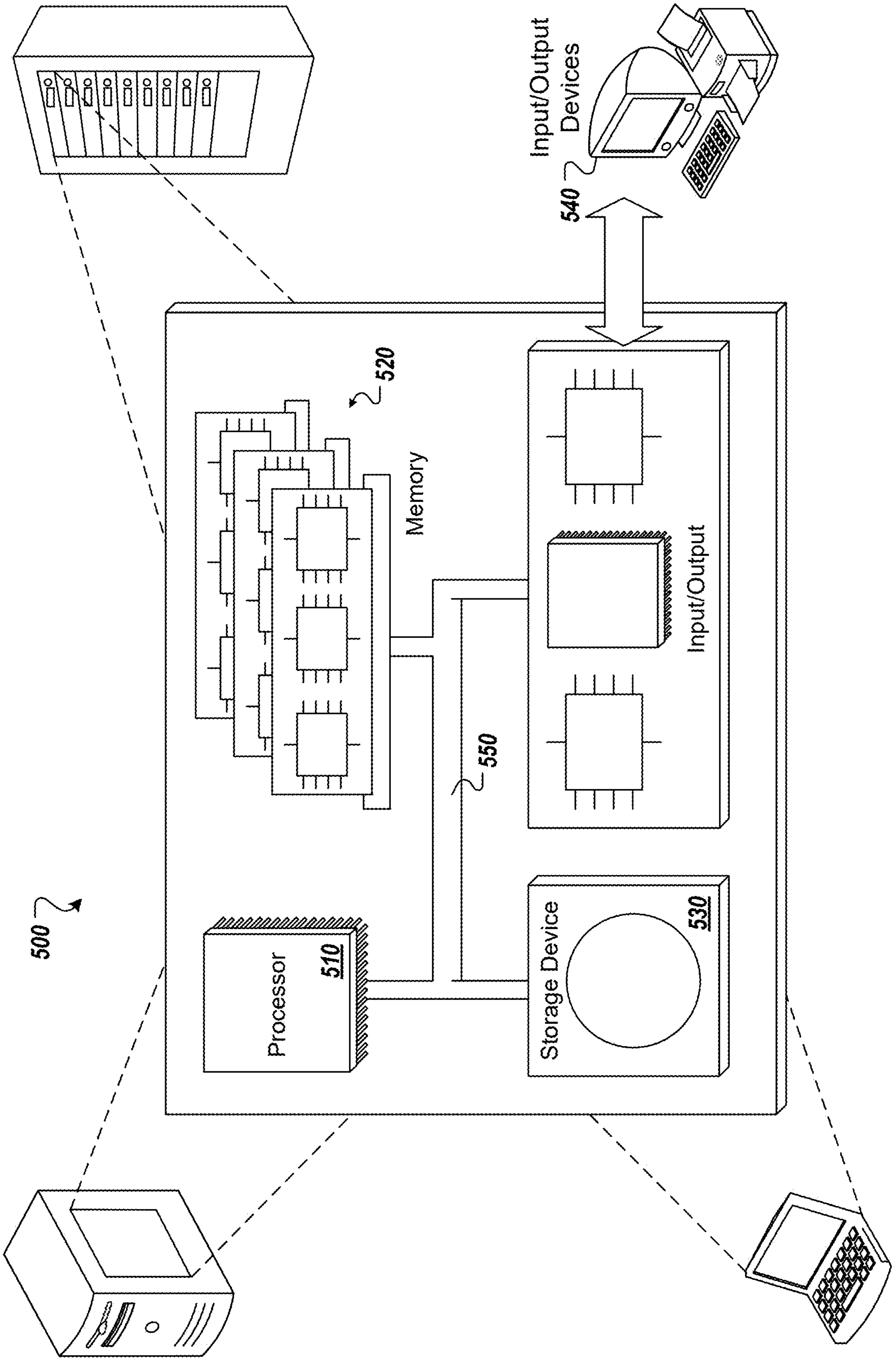
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing recommendations from a computer-implemented recommendation system using a large language model (LLM), the method being executed by one or more processors and comprising:

during a pre-production stage:

generating a set of prompts using a sub-set of items of a set of items available to users;

prompting the LLM using the set of prompts, the LLM returning a set of virtual items, each virtual item being responsive to a prompt in the set of prompts, the virtual item being included in the set of virtual items;

creating a map using the sub-set of items and the set of virtual items;

subsequent to the pre-production stage:

receiving first interaction data representative of a first item a user has interacted with, the first item being included in the set of items available to users;

generating a first set of recommended items through content-based collaborative filtering using the first item;

determining that the first set of recommended items comprises a virtual item that had been generated by the LLM during the pre-production stage, the virtual item comprising a fictional item that is unavailable, and in response:

determining an item from the map using the virtual item as an index, the map mapping items to virtual items generated by the LLM and being generated during the pre-production stage, and replacing the virtual item with the item in the first set of recommended items to provide a modified set of recommended items;

transmitting first item data representative of the modified set of recommended items to display items in the modified set of recommended items to the user;

receiving second interaction data representative of a second item a user has interacted with;

generating a second set of recommended items through content-based collaborative filtering using the second item; and determining that the second set of recommended items is absent any virtual items, and in response:

transmitting second item data representative of the second set of recommended items to display items in the second set of recommended items.

2. The method of claim 1, further comprising, during the pre-production stage:

generating a set of vectors from a catalog of items, each vector in the set of vectors representative of an item in the catalog of items;

defining a set of clusters, each cluster comprising a respective sub-set of vectors of the set of vectors; and determining the sub-set of items from the set of clusters.

3. The method of claim 1, wherein the map comprises a set of item and virtual item pairs.

4. The method of claim 1, wherein the content-based collaborative filtering is executed using an extended set of vectors comprising a first set of vectors representative of items in an item catalog and a second set of vectors representative of virtual items provided by the LLM.

5. The method of claim 4, wherein vectors in the extended set of vectors are generated by a semantic textual similarity machine learning (ML) model.

6. A non-transitory computer-readable storage medium coupled to one or more processors and having instructions stored thereon which, when executed by the one or more processors, cause the one or more processors to perform operations for providing recommendations from a computer-implemented recommendation system using a large language model (LLM), the operations comprising:

during a pre-production stage:

generating a set of prompts using a sub-set of items of a set of items available to users;

prompting the LLM using the set of prompts, the LLM returning a set of virtual items, each virtual item being responsive to a prompt in the set of prompts, the virtual item being included in the set of virtual items;

creating a map using the sub-set of items and the set of virtual items;

subsequent to the pre-production stage:

receiving first interaction data representative of a first item a user has interacted with, the first item being included in the set of items available to users;

generating a first set of recommended items through content-based collaborative filtering using the first item;

determining that the first set of recommended items comprises a virtual item that had been generated by the LLM during the pre-production stage, the virtual item comprising a fictional item that is unavailable, and in response:

determining an item from the map using the virtual item as an index, the map mapping items to virtual items generated by the LLM and being generated during the pre-production stage, and replacing the virtual item with the item in the first set of recommended items to provide a modified set of recommended items;

transmitting first item data representative of the modified set of recommended items to display items in the modified set of recommended items to the user;

receiving second interaction data representative of a second item a user has interacted with;

generating a second set of recommended items through content-based collaborative filtering using the second item; and determining that the second set of recommended items is absent any virtual items, and in response:

transmitting second item data representative of the second set of recommended items to display items in the second set of recommended items.

7. The non-transitory computer-readable storage medium of claim 6, wherein operations further comprise, during the pre-production stage:

generating a set of vectors from a catalog of items, each vector in the set of vectors representative of an item in the catalog of items;

defining a set of clusters, each cluster comprising a respective sub-set of vectors of the set of vectors; and determining the sub-set of items from the set of clusters.

8. The non-transitory computer-readable storage medium of claim 6, wherein the map comprises a set of item and virtual item pairs.

9. The non-transitory computer-readable storage medium of claim 6, wherein the content-based collaborative filtering is executed using an extended set of vectors comprising a first set of vectors representative of items in an item catalog and a second set of vectors representative of virtual items provided by the LLM.

10. The non-transitory computer-readable storage medium of claim 9, wherein vectors in the extended set of vectors are generated by a semantic textual similarity machine learning (ML) model.

11. A system, comprising:

a computing device; and a computer-readable storage device coupled to the computing device and having instructions stored thereon which, when executed by the computing device, cause the computing device to perform operations for providing recommendations from a computer-implemented recommendation system using a large language model (LLM), the operations comprising:

during a pre-production stage:

generating a set of prompts using a sub-set of items of a set of items available to users;

prompting the LLM using the set of prompts, the LLM returning a set of virtual items, each virtual item being responsive to a prompt in the set of prompts, the virtual item being included in the set of virtual items;

creating a map using the sub-set of items and the set of virtual items;

subsequent to the pre-production stage:

receiving first interaction data representative of a first item a user has interacted with, the first item being included in the set of items available to users;

generating a first set of recommended items through content-based collaborative filtering using the first item;

determining that the first set of recommended items comprises a virtual item that had been generated by the LLM during the pre-production stage, the virtual item comprising a fictional item that is unavailable, and in response:

determining an item from the map using the virtual item as an index, the map mapping items to virtual items generated by the LLM and being generated during the pre-production stage, and replacing the virtual item with the item in the first set of recommended items to provide a modified set of recommended items;

transmitting first item data representative of the modified set of recommended items to display items in the modified set of recommended items to the user;

receiving second interaction data representative of a second item a user has interacted with;

generating a second set of recommended items through content-based collaborative filtering using the second item; and determining that the second set of recommended items is absent any virtual items, and in response:

transmitting second item data representative of the second set of recommended items to display items in the second set of recommended items.

12. The system of claim 11, wherein operations further comprise, during the pre-production stage:

generating a set of vectors from a catalog of items, each vector in the set of vectors representative of an item in the catalog of items;

defining a set of clusters, each cluster comprising a respective sub-set of vectors of the set of vectors; and determining the sub-set of items from the set of clusters.

13. The system of claim 11, wherein the map comprises a set of item and virtual item pairs.

14. The system of claim 11, wherein the content-based collaborative filtering is executed using an extended set of vectors comprising a first set of vectors representative of items in an item catalog and a second set of vectors representative of virtual items provided by the LLM.

15. The system of claim 14, wherein vectors in the extended set of vectors are generated by a semantic textual similarity machine learning (ML) model.

* * * * *